United States Patent [19]
Stephenson et al.

[11] 3,786,843
[45] Jan. 22, 1974

[54] DELAYED FILLING OF AIR BAG

[75] Inventors: Robert L. Stephenson, Sterling Heights; Donald J. Lewis, Troy, both of Mich.

[73] Assignee: Allied Chemical Corporation, New York, N.Y.

[22] Filed: Aug. 24, 1971

[21] Appl. No.: 174,444

Related U.S. Application Data

[63] Continuation-in-part of Ser. No. 81,947, Oct. 19, 1970, Pat. No. 3,674,059.

[52] U.S. Cl. ............... 141/13, 102/39, 141/49, 141/98, 280/150 AB
[51] Int. Cl. ... B60r 21/08, B65d 35/26, B65b 31/04
[58] Field of Search ....... 141/4, 5, 9, 10, 13, 49, 98; 102/37.1, 37.3, 39; 280/150 AB

[56] References Cited
UNITED STATES PATENTS

| | | | |
|---|---|---|---|
| 3,715,131 | 2/1973 | Hurley | 280/150 AB |
| 3,724,870 | 4/1973 | Kurokawa | 280/150 AB |
| 3,731,843 | 5/1973 | Anderson | 280/150 AB |
| 3,450,414 | 6/1969 | Kobori | 280/150 AB |
| 3,649,045 | 3/1972 | Smith | 280/150 AB |
| 3,692,495 | 9/1972 | Schneiter | 23/281 |
| 3,718,332 | 2/1973 | Jones | 280/150 AB |
| 3,674,059 | 7/1972 | Stephenson | 141/4 |
| 3,516,685 | 6/1970 | Goetz | 280/150 AB |
| 3,532,360 | 10/1970 | Leising | 280/150 AB |
| 3,586,347 | 6/1971 | Carey | 280/150 AB |
| 3,304,963 | 2/1967 | Greenlee | 141/9 X |
| 3,663,035 | 5/1972 | Norton | 280/150 AB |
| 3,663,036 | 5/1972 | Johnson | 280/150 AB |
| 3,680,886 | 8/1972 | Mazelsky | 280/150 AB |

*Primary Examiner*—Wayne A. Morse, Jr.
*Attorney, Agent, or Firm*—Jonathan Plaut

[57] ABSTRACT

A method and apparatus for filling motor vehicle gas bags. A gas-filled cylinder is provided with an inlet pressure sensitive rupture disc and a dislodgeable outlet plug. The inlet disc is in communication with a combustible material. The material is fired, yielding a gaseous product. The outlet plug is dislodged before the rupture of the inlet disc at least substantially emptying the cylinder before said disc ruptures. The liberated gas flows to a diffuser, about which a motor vehicle gas bag or bags are disposed, whereby the filling of gas bag (or bags) is delayed, it being filled first with gas filling the cylinder and then with gas generated from the combustible material when the disc ruptures.

2 Claims, 2 Drawing Figures

INVENTORS.
ROBERT L. STEPHENSON
DONALD J. LEWIS
BY:
ATTORNEY.

INVENTORS.
ROBERT L. STEPHENSON
DONALD J. LEWIS
BY:
ATTORNEY.

DELAYED FILLING OF AIR BAG

This application is a continuation-in-part of Ser. No. 81,947, filed Oct. 19, 1970, now U.S. Pat. No. 3,674,059, issued July 4, 1972.

BACKGROUND OF THE DISCLOSURE

The instant invention is directed to a method and apparatus for delayed filling of an autombile gas bag. More specifically, the instant invention is directed to a method and apparatus for delayed filling of a gas bag employing both pressurized gas and pyrotechnic means. Most specifically, the instant invention is directed to a method and apparatus for filling an automobile gas bag by means of a combined stream of bottled gas and combustion product gas.

It has been proposed that inflatable gas bags be employed in motor vehicles and especially automobiles as a means for constraining passengers therein, to prevent serious injuries in the event that the vehicle is involved in an impact. The use of gas bags is suggested as an alternative to seat belts which are presently employed. Although seat belts provide excellent protection against serious injury in automobile impacts, they suffer from the disadvantage that they are often not used. Ample evidence of their non-use is provided by the ever increasing toll of fatalities and serious injuries which occur each year on the nation's roads due to automobile and motor vehicle accidents.

It is proposed that a method be employed which would provide the protection of seat belts without requiring any voluntary act on the part of the motor vehicle driver or passenger. A method and appartatus which meets these requirements is motor vehicle or automobile gas bags. A vehicle gas bag is actuated upon impact automatically. The vehicle gas bag is instantaneously filled upon impact, constraining the automobile occupants in their seats during the critical moments following impact.

When this method of protection was first suggested, the means suggested for filling the gas bags was the commonly employed method of filling inflatable devices. That is, the use of a cylinder of pressurized gas. Then it was proposed to use a combination stored and generated gas system, as in U. S. application Ser. No. 81,947.

It has been found that by slowing down the filling of the gas bag, that is, by delaying at least a part of the filling, that protection may be had for what is known as a slow crash; that is, a crash at a slow speed. For a set rate of gas bag inflating on impact occuring at slow speed may cause injury to the occupants due to the relative large magnitude of momentum imported against the occupant by the rapidly inflating gas bag. Momentum is defined as the difference between the momentum of the inflating bag and the momentum of the occupant which, in turn, is proportional to the velocity of the vehicle. This is especially significant when the occupant is a child. The occupant's momentum, of course, is also directly proportional to the mass of the occupant. Thus a small child, having small mass, has a relatively small momentum upon impact of a slow moving vehicle. If the bag inflates at too high a rate of velocity, serious injury to a small occupant may result. In this situation a slowing down of the speed with which the bag inflates results in a safer disposition of the bag in the car. This is particularly useful in the case of a standing child in the right front passenger seat (a child standing on the floor in front of the dash panel). Such delaying, as will be described, also results in a reduction of sound level, on inflation, as will also be described.

SUMMARY OF THE INVENTION

The method and apparatus of the instant invention is directed to filling a gas bag or bags disposed on a vehicle. The bag filling method and apparatus of the instant invention employs a small gas cylinder, maintained at relatively low pressure, and means for supplementing the mass and pressure of the bottle with a pyrotechnic device. Means, as will be described, are employed for slowing down the bag filling process.

When a vehicle equipped with an embodiment of the instant invention is involved in an impact, in one embodiment, a signal is sent from a sensor to a gas cylinder which has been filled with a compressed gas, for example nitrogen, and the cylinder at least substantially empties into the gas bag through a ruptured plug. A pyrotechnic triggering mechanism then fires a combustible product, which combustion results in the generation of large amounts of gas. That gas is constrained in a very small volume adjacent the cylinder until the pressure increase is such that a disc disposed between combustible product and the gas cylinder breaks causing the movement of the generated gas into the gas cylinder and to the gas bag. With about a 5 ms. delay after the cylinder starts to empty before the generated gas is supplied, the cylinder is 15 percent emptied. With about an 80 ms. delay, the cylinder is 80 percent empty. A delay of about 25 ms. is preferable.

Alternately, the pyrotechnic or combustible device may be composed so as to be slow burning, so that the simultaneous or substantially simultaneous blowing of the plug and burning of the pyrotechnic will result in emptying of the cylinder before the generated gas ruptures the disc.

In one embodiment, the gas generating means is in an enclosed space in communication with a gas containing means, a cylinder. The cylinder is filled with a gas, situated downstream of the gas generating means. The gas generating means and the gas containing means are separated by a pressure sensitive barrier, the disc referred to. The gas from the gas generating means flows into the gas containing means. Means are provided for breaking the sealed outlet of the gas containing means, the plug referred to, prior to rupture of the barrier between the gas generating and gas containing means, whereby the cylinder empties into the bag at least substantially before the generated gas is liberated for use in filling the gas bag.

BRIEF DESCRIPTION OF THE DRAWING

The instant invention may be better understood by reference to the accompanying drawings of which.

DETAILED DESCRIPTION

Figure 1:
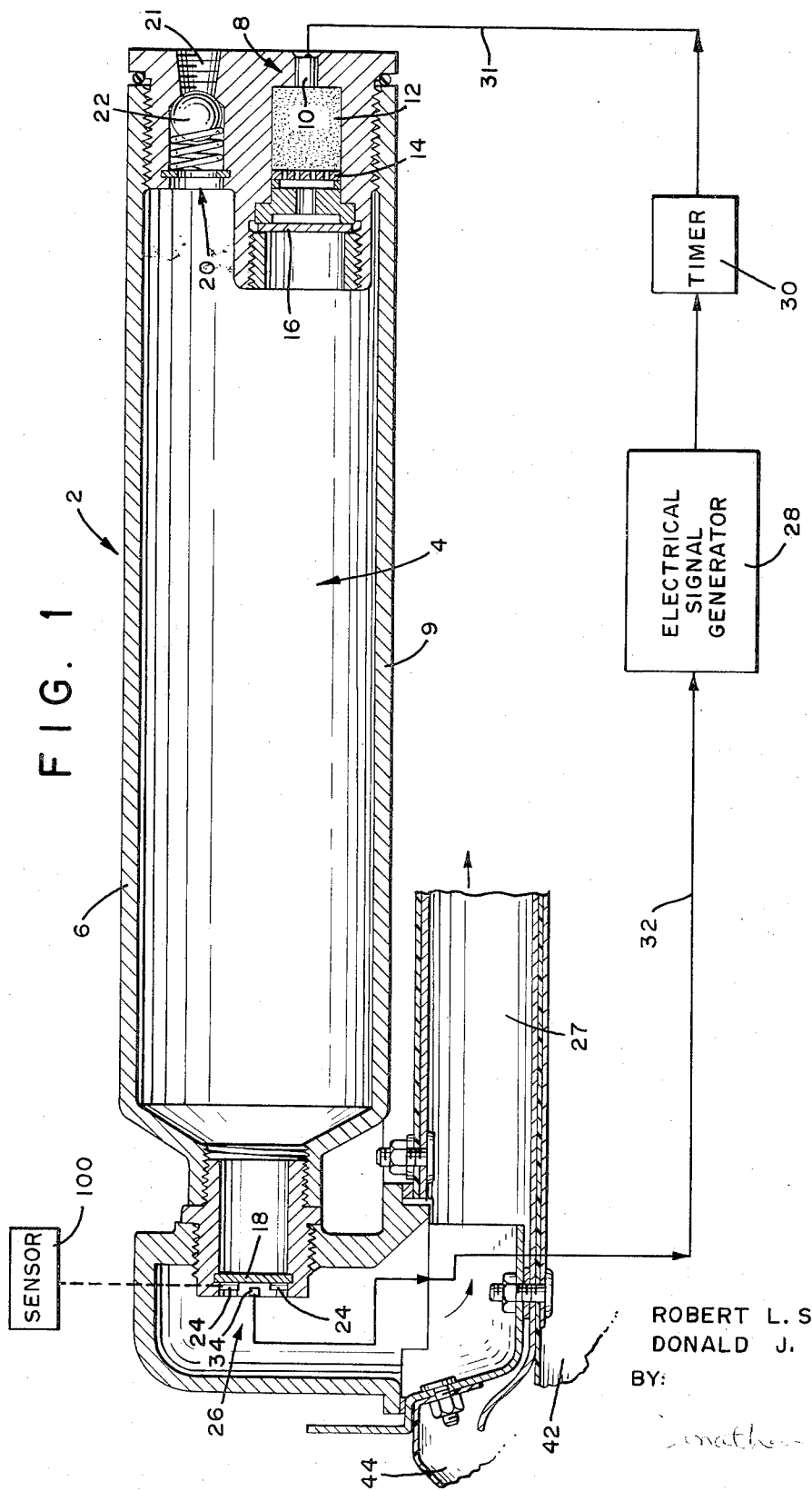
FIG. 1 is a sectional elevation view of an embodiment of the gas filling means of the instant invention.

Turning to FIG. 1 in detail, the overall delayed gas filling means of the instant invention is generally indicated at 2. The gas filling means 2 comprises a gas containing means (a cylinder) generally indicated at 4 and a gas generating means generally indicated at 8. Both compartments are enclosed in a pressurized tank 6. Typical of pressurized tanks, tank 6 is preferably in the shape of a cylinder.

The gas containing means 4 comprises everything within the tank 6 with the exception of the gas generating means 8. This includes a gas inlet means 20. The gas inlet means 20, in a preferred embodiment, comprises a tapped hole 21 which provides for communication with the source of compressed gas (not shown) and a ball check valve 22. The use of the check valve 22 is preferred in order to insure against any back flow of stored gas. In FIG. 1 the gas inlet means is shown disposed at the upstream end of the tank 6. It should be appreciated that this position of the inlet means 20 is optional and in other preferred embodiments the location of the inlet means 20 may be in other positions on the tank. The outlet of the gas containing means 4 comprises an outlet plug 18, which will be described in greater detail hereinafter. Because of the pressures which are maintained within the gas containing means 4, the tank 6 is provided with a thick wall metal casing 9. The thickness of the wall 9 is designed so as to insure the structural integrity of the tank 6 if the wall is subjected to pressures in excess of those anticipated. The compressed gas contained within the tank is preferably air or nitrogen. Other gases of the type which are not toxic to humans and do not have a deleterious effect on the gas bags, shown in this embodiment at 42 and 44, in which they are to be contained may be substituted for the preferred gases enumerated above.

The gas generating means 8 includes a squib 10. The squib 10 is in communication with an electrical impulse means 28 which supplies the spark to ignite the squib 10. The squib 10 is adjacent a source of combustible material, disposed in a combustible chamber 12. The chamber 12, a part of the generating means 8, comprises any combustible solid which generates relatively large volumes of gas upon combustion. In one preferred embodiment, composite propellant is employed as the combustible material in the chamber 12. Other materials which are easily burned and which generate large amounts of gas may be substituted for the composite propellant. A slow burning propellant may also be utilized. Also, the configuration of the propellant may be specifically designed to effect the burning characteristic desired. A diffuser 14 is disposed at the downstream end of the combustion chamber 12.

Direction of flow from the gas generating means through the gas container means, or reservoir, and out of the gas container means to the diffuser and bag is preferably substantially in a single direction, as shown. This single direction of flow provides for simplicity and efficiency, maximum mixing of generated gas and compressed gas, quick emptying of gas into the bag, and the reduction of cross current or eddy flow of gases, among other advantages.

The diffuser 14 provides uniform pressure and velocity of the combustion gas products which move downstream in the chamber 12. The gas generating means 8 also includes a rupture disc 16. The disc 16 separates the gas generating means 8 from the gas containing means 4. The disc 16 is designed to rupture at a specified pressure, or alternatively, for example, an electrical signal by the use of an explosive charge mounted thereto (not shown). As will be described below, this pressure of rupturing in one embodiment is in the range of approximately 3,000 to 5,000 pounds per square inch. The disc 16 may be constructed of any suitable material which will satisfy the design parameters.

In addition to the gas containing means 4 and the gas generating means 8, the apparatus of the instant invention includes an outlet means 26. The outlet means 26 provides a conduit to move the exiting gases from the gas containing means 4 into a diffuser 27. The outlet means 26 configuration shown in FIG. 1 is illustrative and in no way limits the design of these means 26. In all cases, the means 26 directs the gases from the gas filling means 2 to the diffuser to which a gas bag or bags 42 and 44 are connected.

The method of the instant invention for filling a gas bag comprises employing the cylinder to supply at least substantial gas to the bags and then thereafter for the gas generating means 8 to add generated gas. A preferable gas generating means 8 is of the pyrotechnic type described above. A pyrotechnic device of the kind illustrated in FIG. 1 provides the twin advantages of an absolute minimum volume stored requirement with the additional advantage of the storage of high pressured gas potential at atmospheric pressure. In the design disclosed the time of supply of gas into the bag is delayed.

The instant method in this embodiment for plug 18 removal is illustrated in FIG. 1. The plurality of shape charges 24 are disposed around the periphery of the plug 18. Upon an electrical signal from an impact sensing sensor 100 the shape charges 24 explodes releasing the plug 18 from the tank 6. The signal to initiate the explosive charges 24, in this case, precedes the signal igniting the squib 10. This second signal from the ruptured plug 18 to the squib 10 is delayed by use, for example, of a timer 30 and is transmitted at a time after the initial signal to the plug. FIG. 1 illustrates this method. Upon rupture of the plug 18, a probe 34 is disturbed creating an electrical impulse transmitted by means of an electrical conduit 31 to an electrical signal generator 28. The generator 28 generates a signal conducted by a second electrical conduit 32. The timer 30, is employed to hold up transmission of the electrical signal to ignite the squib 10 for the required time so that plug dislodgement occurs some time before firing of the squib. The time interval between plug removal and signal generation is selected so that substantial emptying of the cylinder will occur before generating gases break the disc 16. This necessary time interval may be calculated by experimental or analytical means.

In one embodiment, as described, the gas generating means is actuated upon an electrical signal transmitted to squib 10 from timer 30. The gas generating means 8 provides an excellent actuating means. The electrical signal causes ignition of the squib 10. The squib 10, which comprises a rapid burning powder almost instantaneously ignites the combustible material in the combustion chamber 12. The combustion of combustible material in chamber 12 ignites, resulting in the rapid generation of high pressure, high temperature gas products. Due to the small volume of the chamber 12 pressures build up very rapidly. The gas exerts uniform pressure on the walls of the chamber 12. Three of the four walls are designed to withstand higher pressures than that generated by the gaseous product of the reaction in the chamber 12. However, the fourth wall is provided with the rupture disc 16 which is designed to withstand pressures not in excess of about 3,000 to 5,000 psi, in one embodiment. Pressures in excess of this amount result in the rupturing of the disc 16 with the resultant liberation of the constrained generated gases into the tank 6 of the gas containing means 4. In the preferred embodiment illustrated in FIG. 1, the disc 16 is in axial alignment with the axis of the horizontal tank 6. This disposition of the disc 16 in relation to the tank 6 provides the simplest and most efficient flowing of the gases generated in the chamber 12 through the cylinder 6. The diffuser 14 is disposed immediately upstream of the rupture disc 16 in order to prevent any non-uniformity of pressure on the disc 16. This prevents the unlikely occurrence of a pressure buildup on one section of the disc with the resultant rupture of the disc before the pressure in the chamber 12 attains the uniform design pressure.

The tank of the gas containing means 4 is originally filled with an inert gas such as air, nitrogen or the like to a pressure in the range of about 1,000 to 3,000 pounds per square inch and preferably about 2,000 pounds per square inch. In order to accommodate this initial pressure the tank 6 has a volume in the range of about 50 to 150 cubic inches and preferably 100 cubic inches. The surge of hot gas from the gas generating means 8 after the disc is ruptured may increase the pressure in the tank 6 to a pressure in the range of 3,000 and even as high as 5,000 psi, or higher.

In an alternative embodiment, as discussed, the timer circuit shown may be dispensed with, and a slow burning pyrotechnic (combustible material) substituted therefore. In such case, signal from the sensor shown would ignite the charges 24 and the squib 10 substantially simultaneously and the slow burn of the pyrotechnic would allow the cylinder to at least substantially empty into the bag or bags before the disc 16 ruptures.

Other methods of insuring a delay between emptying of the cylinder and the pyrotechnic chamber may be utilized besides those two embodiments discussed. Furthermore, systems for alternately delaying the generation of from the pyrotechnic direction into the cylinder or not may be utilized.

It should be appreciated from the above, that in the method of the instant invention gas in the gas containing means flows into the diffuser and the gas bag at different temperatures and pressures depending on how completely the cylinder is emptied of stored gas before the generated gas enters thereinto. Of course, the gas stream flowing into the gas bag will be at a higher temperature and pressure if the disc 16 of the gas generating means 8 is released closer in time to release of the gas containing means plug 18, due to the mixing of the stored and generated gases and the fact that this additional mass of gas is constrained within the same fixed volume. The lowest temperature and pressure is attained when release of the gas containing means plug 18 substantially completely occurs prior to release of the gas generated in gas generating means 8 into the gas containing means 4.

Another problem that arises in the inflation of vehicle gas bags is the noise accompanying bursting of the barrier 18 between the outlet 26 and gas containing means 4 and the barrier 16 between the gas generating means 8 and the gas containing means 4, as well as the noise associated with the rush of gas (the kinetic energy) to fill the bag or bags. This noise level must be within acceptable limits. The minimum total noise level generated occurs in the case where release of the barrier 18 between gas containing means 4 and the outlet 26 occurs substantially prior to the release of the barrier 16 between the gas generating means 8 and the gas containing means 4, so that cylinder 4 is substantially empty of stored gas before barrier 16 is ruptured. The maximum noise level occurs when the sequence of release of the two barriers is reversed, that is, release of the barrier 16 of the gas generating means prior to release of the barrier 18 of the gas containing means. Noise levels have been reduced from about 163 db where disc 16 ruptures simultaneous with rupture of plug 18 to about 156 db where disc 16 ruptures substantially after, that is about 80 ms. after, the cylinder 4 is emptied into the bag or bags.

It is preferred, in one embodiment, to slow the filling of the bag down from $x$ time to $2x$ time, and it has been found that such slowing down can be accomplished without degradation to the bag's performance. Typically, if normal bag filling time (breaking of seal 18 and seal 16 simultaneously) is about 80 ms. from the time a bag filling situation is sensed, according to this invention such full bag filling condition is delayed to about twice the time. In any event, the delay in bag filling is preferably from about 5 ms. to about 80 ms., and an 80 ms. delay results in twice the time for normal filling time as compared to no delay, to accomplish the desired results of a soft restraint at lower speed crash and a lower noise level.

Figure 2:
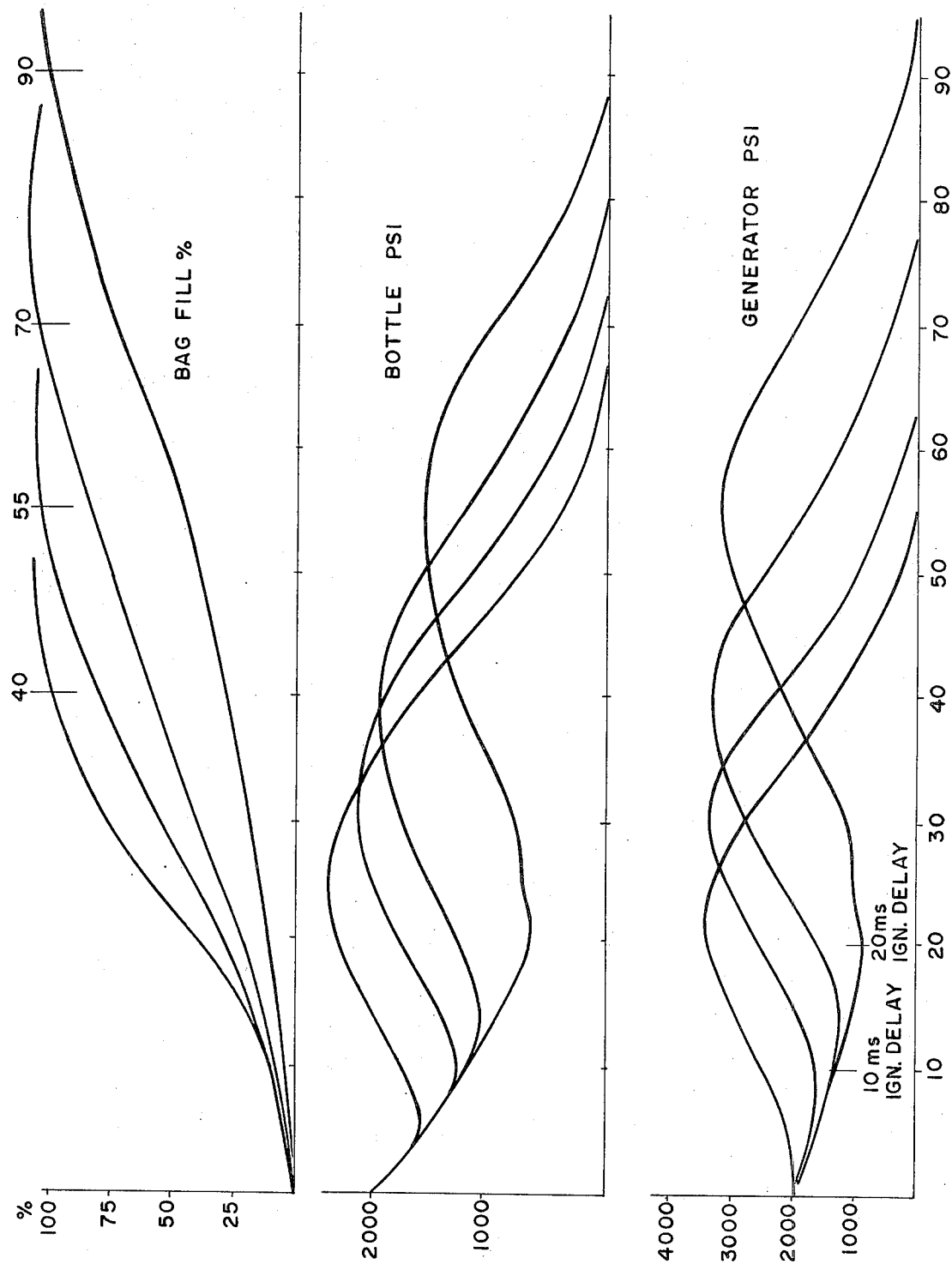
FIG. 2 illustrates in graph form the results of delayed bag fill.

The results of slowing down the speed of filling is shown in the charts of FIG. 2, in which the top line is in each case a simultaneous blowing of plug 18 and disc 16 and the succeeding line below represents a 5 second delay, then a 10 second delay and then a 10 second delay between the blowing of plug 18 and the later rupture of disc 16. As may be seen, bag fill occurs at later times by such delay and with maximum pressures that are delayed and add to a lower energy (noise) level.

Although the gas filling means of the instant invention may be designed to fill more than one bag, the preferred embodiment described relates to a filling means to fill a single bag system (which may be the bag within a bag, 42 within 44, for shock absorbing effect, as shown) disposed about a diffuser. Those skilled in the art will appreciate that the outlet means 26 may be a manifold directed to several diffusers throughout the vehicle whereby the gas filling means of the instant invention may be employed to fill more than one bag. It is anticipated that a single gas filling means will be employed to fill a single bag because a filling means which fills more than one bag would require more space than is probably available in any one location in the vehicle. However, this point is a matter of choice for the designer.

It should be appreciated that the above-identified preferred embodiment of the method and apparatus of the instant invention is meant to be illustrative only. The foregoing specification and drawing will make apparent various modifications which are within the contemplation of the instant invention. Thus, the scope of the instant invention should be limited only by the appended claims.

What is claimed is:

1. An apparatus for delaying at least substantial filling of an inflatable restraint comprising:
   a. a gas containing vessel to be filled with a pressurized gas and provided with an inlet and outlet means;

b. gas generating material producing a generated gas in a chamber disposed adjacent to said gas containing vessel;
c. barrier means disposed between said gas containing means and said gas generating material;
d. an outlet means in communication with said gas containing vessel and said inflatable restraint whereby a gas stream first comprising substantially said pressurized gas and then substantially said generated gas flows from said gas containing vessel to said restraint, thereby filling said restraint, said outlet means sealed from said vessel by rupturable seal means;
e. a means for breaking the seal means whereby at least a substantial portion of said pressurized gas in said vessel exits from said vessel through said outlet means to said inflatable restraint;
f. a gas actuating means to actuate the generation of gas by said gas generating material, electrical means operatively associated with said vessel and chamber, comprising an electric current source and delay means to delay said generation of gas so as to provide sufficient pressure to rupture said barrier means from about 5 ms. to about 120 ms. after the time said seal means is broken; and
g. said actuating means comprising a squib disposed adjacent to said gas generating material, said squib ignited by an electric current communicated to it from said electrical means through said delay timer means whereby said squib ignites said gas generating material.

2. An apparatus in accordance with claim 1, said delay means responsive to the breaking of the seal means to actuate gas generation actuating material.

* * * * *